Patented May 6, 1941

2,241,175

UNITED STATES PATENT OFFICE 2,241,175

METHOD OF DISTILLING MONOMERIC POLYMERIZABLE SUBSTANCES

Carl E. Barnes, Worcester, Mass., assignor to Norton Company, Worcester, Mass., a corporation of Massachusetts No Drawing. Application January 30, 1939, Serial No. 253,623

6 Claims. (Cl. 202—57)

This invention relates to the distillation of monomeric polymerizable compounds and more particularly to a method of inhibiting polymerization during the stage of distilling such a compound.

It has been difficult heretofore to purify by distillation on a commercial scale certain unsaturated methylene compounds which are readily polymerized by heat at the temperature of distillation. Many such polymerizable substances may be protected from polymerization by the use of various inhibitors placed in the monomeric liquid; but when purification by distillation is attempted, the liquid condensate often polymerizes in the distilling column. For example, methacrylic acid may be kept in a monomeric state for a time at the boiling temperature by the addition of pyrogallol as a polymerization inhibitor. But if an attempt is made to purify this substance by distilling it through even a very short column and at reduced pressure, polymerization of the condensed vapors occurs so readily that the column is completely blocked in a very short time. Methacrylic acid can be distilled by a flash method wherein the impure inhibited acid from the reaction mixture is dropped into a heated vessel and the vapors thus rapidly formed are then immediately chilled. This method not only affords very little purification but in addition a considerable quantity of inhibitor is carried over into the distillate and renders the product completely useless for some purposes.

The primary object of this invention is to overcome such difficulties and to provide a method of purifying various polymerizable compounds by distillation which will serve to prevent polymerization to any material extent.

A further object is to provide a method of distilling such polymerizable unsaturated methylene compounds which will serve effectively to prevent polymerization in both the flask and the distilling column during distillation thereof and which will not contaminate the pure condensate derived therefrom. Further objects will be apparent in the following disclosure.

In accordance with my invention, I propose to purify by distillation a polymerizable monomeric substance comprising an acid having the formula $$CH_2=C-COOH$$
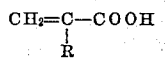

in which R may be hydrogen, halogen or a methyl group, as well as other derivatives of these acids, such as the anhydrides thereof and the esters of these acids with the monohydric or polyhydric alcohols, which contain some of the corresponding acid when in their crude condition. Examples of such substances are acrylic acid, chloro-acrylic acid, methacrylic acid and their anhydrides and methyl alcohol esters.

Polymerization of such substances within a fractionating or distilling column is prevented by the use of a polymerization inhibitor which is located at all points wherever the heated condensate derived from the condensing vapor tends to polymerize to any material and detrimental extent. The inhibitor is to be selected in accordance with the substance to be protected and should preferably be a substance having a low vapor pressure so that it will not be carried over into the distillate. Thus for protecting acrylic acid or chloro-acrylic acid or methacrylic acid, as well as other suitable substances containing one of the acids, I prefer to use copper or chromium in its metallic condition.

The metal is preferably used in a condition of large surface area. For this purpose, I preferably use a porous metal packing for the column, such as a sponge metal, metal wool and wire cloth or gauze or knitted fabric made of the copper, iron or other suitable metal which has a very large surface as compared with its volume. A metal fabric is particularly serviceable as a packing for a fractionating or distilling column, in which the metal may be arranged, for example, as a roll of cloth, which substantially fills the column but leaves adequate space within its meshes through which the distilling vapor and condensed liquid may pass. This porous metal packing may also be in the form of globules, rods, balls, rings, metal turnings and various other shapes, the main requisite being that of providing sufficient porosity for the distilling operation and yet providing enough metal surface to insure good fractionation and maximum inhibiting action. The metal packing may also be intermixed with standard packing materials heretofore employed, such as glass helices, saddles, etc., also the inhibiting metal may be used only in places where polymerization tends to take place materially, and the remainder of the column may be packed with inert materials, such as glass.

If the distilling column contains a dephlegmator at the top, then the wall at the lower portion of the dephlegmator may be made of copper or chromium or covered therewith so that the condensate which forms will be inhibited. It is also to be appreciated that if an inhibitor is used which is slightly soluble in the monomeric liquid, such as copper with methacrylic acid, then the copper methacrylate thus formed within the column which travels back with the condensing liquid into the distilling flask may serve to prevent polymerization of the boiling liquid. Neither the metals nor any salts thereof formed in the column can pass over into the condenser with the distilled vapors, because of their low vapor pressures and their inability to travel with the vapors. Therefore, both the metals and the soluble salts will remain in the column and the distilling flask there below.

As an example illustrating this invention, I may purify methacrylic acid by placing the impure monomeric substance in a distilling flask connected to a condenser through an intermediate distilling column of considerable height, such as three to ten feet, which is held at the boiling point of the product being distilled at the chosen pressure. This distilling column, which may be otherwise of standard construction, is packed with a roll of copper gauze, coiled copper wire, copper turnings, etc., but providing sufficient space for the liquid and vapors to pass in close relationship in opposite directions. The entire column may be packed with the inhibiting metal which serves also as the packing for the fractionation. The vapors pass from the top of this column directly into a water cooled condenser of standard construction which is arranged to cool the vapors quickly to a safe temperature at which polymerization is negligible. It will be appreciated that the expediencies of construction and operation of the process may make it not feasible to locate the protecting medium at every point where polymerization tends to take place, but nevertheless this protection will be employed wherever feasible, and the claims are to be interpreted accordingly.

It is to be understood that this invention is not to be considered as limited by any theory of operation above discussed, and that this disclosure is to be viewed as illustrative of the invention and not as limiting the scope of the claims appended hereto. This case is a continuation in part of my copending application Serial No. 195,816 filed March 14, 1938.

I claim:

1. The method of purifying a monomeric polymerizable substance comprising an acid having the formula

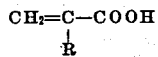

in which R is selected from the group of hydrogen, halogen and the methyl group comprising the steps of distilling the substance and passing the vapor into a fractionating column and there causing the vapor and condensate to contact intimately with a packing presenting an extensive surface area of an inhibitor metal selected from the group consisting of copper and chromium which is located wherever polymerization tends to occur materially, and causing the desired vapor to pass substantially free from said inhibitor and impurities to a cooling zone and there condensing the vapor and quickly cooling the condensate to a temperature at which polymerization will not take place.

2. The method of purifying a monomeric polymerizable substance comprising a compound having the formula

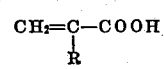

in which R is selected from the group of hydrogen, halogen and the methyl group comprising the steps of boiling the substance in the presence of a polymerization inhibitor, passing the vapor into a fractionating column and there causing the vapor and condensate to contact intimately with a packing of a metal selected from the group of copper and chromium which is located wherever polymerization tends to occur materially, and causing the desired vapor to pass substantially free from said inhibitor and impurities to a cooling zone and there condensing the vapor and quickly cooling the compound to a temperature at which polymerization will not take place.

3. The method of purifying a monomeric polymerizable substance comprising a crude anhydride of an acid selected from the group of acrylic, chloro-acrylic and methacrylic acids comprising the steps of distilling the substance and passing its vapors through a long fractionating column containing a packing presenting an extensive surface area of a metal selected from the group of copper and chromium which is located wherever polymerization occurs materially and contacting the condensate in the column intimately with said metal surface, while passing the vapors therefrom to a condenser and rapidly chilling the same to a temperature at which polymerization is negligible.

4. The method of distilling a polymerizable monomeric substance containing an acid having the formula

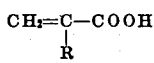

in which R is selected from the group of hydrogen, halogen and the methyl group comprising the steps of boiling the substance and passing the vapors through a packed distilling column presenting an extensive surface of metallic copper as a polymerization inhibitor which is located near the top of the column, and causing the condensed vapors to contact with and dissolve a portion of the copper and to trickle down through the packing in such a manner that the condensate in the entire column and the boiling liquid is in contact with the inhibitor, and quickly chilling the vapor issuing from the column to a temperature at which polymerization of the condensate is negligible.

5. The method of purifying methacrylic acid comprising the steps of boiling the acid and contacting the vapors and their condensate intimately with an extensive surface of copper metal in a distilling column and causing the condensate to return to the boiling acid with any dissolved copper salt therein while the vapors pass to a condenser and cooling the vapors rapidly to a temperature at which polymerization of the condensate is negligible.

6. The method of purifying methacrylic acid comprising the steps of boiling it and passing the vapors through a distilling column to a condenser and causing the condensate within the column to contact intimately with an extensive surface of chromium while returning to the boiling substance, and quickly chilling the vapors issuing from the column to a temperature at which polymerization is negligible.

CARL E. BARNES.